US007523016B1

(12) United States Patent
Surdulescu et al.

(10) Patent No.: US 7,523,016 B1
(45) Date of Patent: Apr. 21, 2009

(54) DETECTING ANOMALIES

(75) Inventors: Razvan Surdulescu, San Francisco, CA (US); Kourosh Gharachorloo, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/618,607

(22) Filed: Dec. 29, 2006

(51) Int. Cl.
*G06F 11/30* (2006.01)
*G21C 17/00* (2006.01)

(52) U.S. Cl. ............................................. 702/185
(58) Field of Classification Search ......... 702/179–182, 702/185, 188, 189
See application file for complete search history.

(56) References Cited

U.S. PATENT DOCUMENTS

| | | | | |
|---|---|---|---|---|
| 5,263,120 | A | 11/1993 | Bickel | 706/62 |
| 5,715,397 | A * | 2/1998 | Ogawa et al. | 709/246 |
| 6,298,351 | B1 | 10/2001 | Castelli et al. | 707/102 |
| 6,907,436 | B2 | 6/2005 | Ye et al. | 707/203 |
| 2005/0193281 | A1* | 9/2005 | Ide et al. | 714/47 |
| 2006/0161592 | A1 | 7/2006 | Ertoz et al. | 707/200 |
| 2006/0242706 | A1 | 10/2006 | Ross | 706/23 |
| 2006/0293777 | A1 | 12/2006 | Breitgand et al. | 700/108 |
| 2008/0077515 | A1* | 3/2008 | Zoldi et | 705/35 |

OTHER PUBLICATIONS

*NSOM: A Real-Time Network-Based Instrusion Detection System Using Self-Organizing Maps*, by Labib et al., for Department of Applied Science, University of California, Davis, 6 pages, 2002.
*Unsupervised learning techniques for an intrusion detection system*, by Zanero et al., for Dipartimento di Elettronica e Informazione, Politecnico di Milano, Copyright 2004, 8 pages.
*Artificial Neural Networks for Misuse Detection*, by James Candy, in Proceedings of the 1998 National Information Systems Security Conference (NISSC'98), pp. 443-456, Oct. 5-8 1998. Arlington, VA.

* cited by examiner

*Primary Examiner*—Michael P Nghiem
(74) *Attorney, Agent, or Firm*—Fish & Richardson P.C.

(57) ABSTRACT

In general, systems and methods for identifying anomalous activity are described. For example, systems and methods are described, in which patterns of unusual behavior can be identified by aggregating logged, or sampled, data into cells and annotating each cell with statistically derived measures of how extreme the cell is relative to, for example, historical behavior of corresponding characteristics or relative to, for example, behavior of characteristics from a general population. Cells that have more than a predefined number of such annotations can be identified as anomalous and can be investigated by a user or outright acted upon in an automatic, pre-defined way.

20 Claims, 10 Drawing Sheets

Network Log Entries

| Source | Destination | Requested Page | Time | Ad Impressions | Ads Clicked |
|---|---|---|---|---|---|
| $IP_1$ | $D_1$ | page 1 | Hour 1 | $AD_1$ ; $AD_2$ | $AD_1$ |
| $IP_2$ | $D_1$ | page 2 | Hour 1 | $AD_2$ ; $AD_3$ ; $AD_4$ | ∅ |
| $IP_1$ | $D_2$ | page 3 | Hour 1 | $AD_4$ ; $AD_5$ | $AD_4$ |

FIG. 2A

Aggregated Indexed Log Entries

| Key | Unique Destinations | Pages Visited | Hour | Number Of Ad Impressions | Number Of Ads Clicked |
|---|---|---|---|---|---|
| $IP_1$ | 2 | 2 | Hour 1 | 4 | 2 |
| $IP_2$ | 1 | 1 | Hour 1 | 3 | 0 |

FIG. 2B

Derived Characteristics

| Key | Time | Click-Through Rate (Ads Clicked / Ads Shown) | IP Freq | Cost Per Click |
|---|---|---|---|---|
| $IP_1$ | Hour 1 | 2 / 4 = 0.5 | 2 | 0.025 |
| $IP_2$ | Hour 1 | 0 / 3 = 0 | 0 | 0 |

FIG. 2C

| Key | C1_L | C1_H | C2_L | C2_H | C3_L | C3_H | C4_L | C4_H | ... | CM_L | CM_H |
|---|---|---|---|---|---|---|---|---|---|---|---|
| IP$_1$ | 0 | 1 | 0 | 0 | 1 | 0 | 1 | 0 | ... | 0 | 1 |
| IP$_2$ | 1 | 0 | 0 | 1 | 0 | 0 | 0 | 0 | ... | 0 | 0 |
| IP$_3$ | 1 | 0 | 0 | 0 | 1 | 0 | 0 | 1 | ... | 1 | 1 |
| IP$_4$ | 0 | 0 | 0 | 0 | 0 | 1 | 0 | 0 | ... | 0 | 0 |
| IP$_5$ | 1 | 0 | 0 | 1 | 0 | 1 | 0 | 1 | ... | 0 | 0 |
| IP$_6$ | 1 | 0 | 0 | 1 | 0 | 1 | 0 | 1 | ... | 0 | 0 |

FIG. 6

Run Details:

| Run Id | Run Date | Stats | Confidence Interval |
|---|---|---|---|
| 198 | 2006-08-08 | lp | 97.5% |

Rule List:

| Column Name | Rule Definition |
|---|---|
| Char1_Fit_H | (AND (> (LENGTH [Char1_Fit]) 4.0) (> Char1_Fit (+ LINPRED [Char1_Fit]) (* 5.0 (LINERR [Char1_Fit]))))) |
| Char1_Fit_L | (AND (> (LENGTH [Char1_Fit]) 4.0) (< Char1_Fit (- LINPRED [Char1_Fit]) (* 5.0 (LINERR [Char1_Fit]))))) |
| Char1_H | (> Char1 (+6.8958407819800 (/ 20.1644387876229 (SQRT (MIN Clicks 150.0))))) |
| Char1_Slope_H | (AND (> (LENGTH [Char1_Slope]) 4.0) (> (LINSLOPE [Char1_Slope]) 0.493921934296400044)) |
| Char1_Slope_L | (AND (> (LENGTH [Char1_Slope]) 4.0) (< (LINSLOPE [Char1_Slope]) -0.486865076731943571)) |

Cluster List:

| Cluster Id | Hot Bits | Cluster Definition | Cluster Size | Page Views | Impressions | Clicks | Revenue |
|---|---|---|---|---|---|---|---|
| 487000 | 17 | Char1_H | Char1_Slope_H | Char2_H | Char2_Slope_L | Char3_H ... | 1 | 131 | 945 | 240 | $296.17 |
| 486998 | 15 | Char2_H | Char3_H | Char3_Slope_L ... | 3 | 2134 | 19959 | 4545 | $12,129 |
| 486999 | 15 | Char1_Slope_L | Char2_Slope_L | Char3_Fit_H | Char3_H | Char3_Slope_L ... | 1 | 378 | 494 | 18 | $67.02 |
| 486995 | 14 | Char1_H | Char2_H | Char_3_H ... | 2 | 22 | 220 | 84 | $108.63 |
| 486996 | 14 | Char1_H | Char2_H ... | 1 | 27 | 266 | 1348 | $111.11 |

<< Previous | Next >>

FIG. 8

DETECTING ANOMALIES

TECHNICAL FIELD

This instant specification relates to anomaly detection.

BACKGROUND

Anomalous activity can occur in various contexts. In the context of online advertising and a pay-per-click advertising model, opportunities may exist for people to commit fraud, which can be viewed as anomalous activity relative to valid selections of online advertisements. For example, two competitors (A and B) may both purchase advertisements ("ads") that are displayed on a website whenever a user searches for relevant keywords. A may wish to sabotage B by writing a software program that clicks on B's ads until B's daily ad budget is exhausted and only A's ads are shown to subsequent users.

SUMMARY

In general, systems and methods for identifying anomalous activity are described. For example, systems and methods are described, in which patterns of unusual behavior can be identified by aggregating logged, or sampled, data into cells and annotating each cell with statistically derived measures of how extreme the cell is relative to, for example, historical behavior of corresponding characteristics or relative to, for example, behavior of characteristics from a general population. Cells that have more than a predefined number of such annotations can be identified as anomalous and can be investigated by a user or outright acted upon in an automatic, pre-defined way.

In certain implementations, a method is described, which includes monitoring characteristics of sampled data associated with one or more transaction components of a plurality of transaction components and determining whether a value for a first monitored characteristic is unusual based on whether the value is located within a predefined portion of a distribution of values for the first monitored characteristic. The method also includes identifying the sampled data associated with the one or more transaction components as unusual if a predetermined number of values for the monitored characteristics of the sampled data are determined to be unusual.

In other implementations, a method is described. The method includes aggregating network data into entries including network activity for network transaction components during a period of time, annotating each entry with statistically derived measures of how anomalous the entry is relative to other entries, and identifying annotated entries that have annotations specifying that the entry is anomalous if a number of the annotations exceeds a predetermined threshold.

In yet other implementations, a system is described. The system includes means for storing entries that include characteristics of sampled data associated with one or more entities, and means for determining whether selected sampled data associated with an entity is anomalous. The determining is based on calculating a distribution of values for one or more characteristics of the selected sampled data, determining whether the one or more characteristics of the selected sampled data have values categorized as unusual based on the distribution, and identifying the selected sampled data as improbable if a predetermined number of the one or more characteristics are categorized as unusual.

In another implementation, a method is described, which includes sampling values from one or more signals associated with an object and determining whether a sampled value for a signal is unusual based on whether the sampled value is located within a predetermined portion of a distribution of values for the signal. The method also includes identifying the object as unusual if a predetermined number of signals are determined to be unusual.

In certain implementations, the systems and methods described here may provide none, one, or more of the following advantages. Unusual clusters of data (e.g., network traffic) sampled at various points in time across multiple characteristics (e.g., number of page views per user, number of cookies per network address, etc.) can be identified without a-priori knowledge of which data represents fraud or statistical distributions of the data derived from the sampled data. An intuitive interface can be provided for browsing clusters of unusual sampled data. Unusual characteristics can be annotated using bit vectors that describe the anomaly in an easy to read fashion. A bound on anomalous sampled data can be estimated as a function of a number of characteristics that are noted as anomalous.

The details of one or more embodiments of the anomaly detection feature are set forth in the accompanying drawings and the description below. Other features and advantages of the anomaly detection feature will be apparent from the description and drawings, and from the claims.

DESCRIPTION OF DRAWINGS

FIG. 2A is a table of example network log entries.

FIG. 2B is a table of example aggregated indexed log entries.

FIG. 2C is a table of example derived characteristics.

FIG. 6 is an example table of improbable entries.

FIG. 8 is an example set of clusters displayed in a user interface.

Like reference symbols in the various drawings indicate like elements.

DETAILED DESCRIPTION

Certain implementations of systems and techniques are described, which can detect anomalous clusters of data sampled at various points in time across multiple signals. The detection can be accomplished, for example, by searching for data characteristics that are statistically improbable. In certain situations, patterns of unusual behavior identify anomalous sampled data. If the anomaly is widespread, many streams of sampled data may exhibit substantially similar patterns of unusual behavior, and the sampled data can be grouped into similar categories for analysis by a user or can be handled in an automated way.

In certain implementations, patterns of unusual behavior are identified by aggregating logged, or sampled, data into cells and annotating each cell with statistically derived measures of how extreme the cell is relative to, for example, historical behavior of corresponding characteristics or relative to, for example, behavior of characteristics from a general population. Cells that have more than a predefined number of such annotations can be identified as anomalous and can be investigated by a user or outright acted upon in an automatic, pre-defined way. Systems and methods to detect anomalies are described in more detail below.

In the following description, for illustrative purposes, the sampled data includes network traffic that is sampled at various points in time across multiple characteristics, which can include characteristics, such as a number of page views per user, a number of cookies per network address, etc. However, the systems and techniques are not limited to detection of anomalies in network traffic, but can be used to monitor or detect anomalies in various contexts in which multiple characteristics can be sampled, or logged. Additional example contexts are listed below after the following detailed description of an implementation based on detecting anomalies in network traffic.

Figure 1:
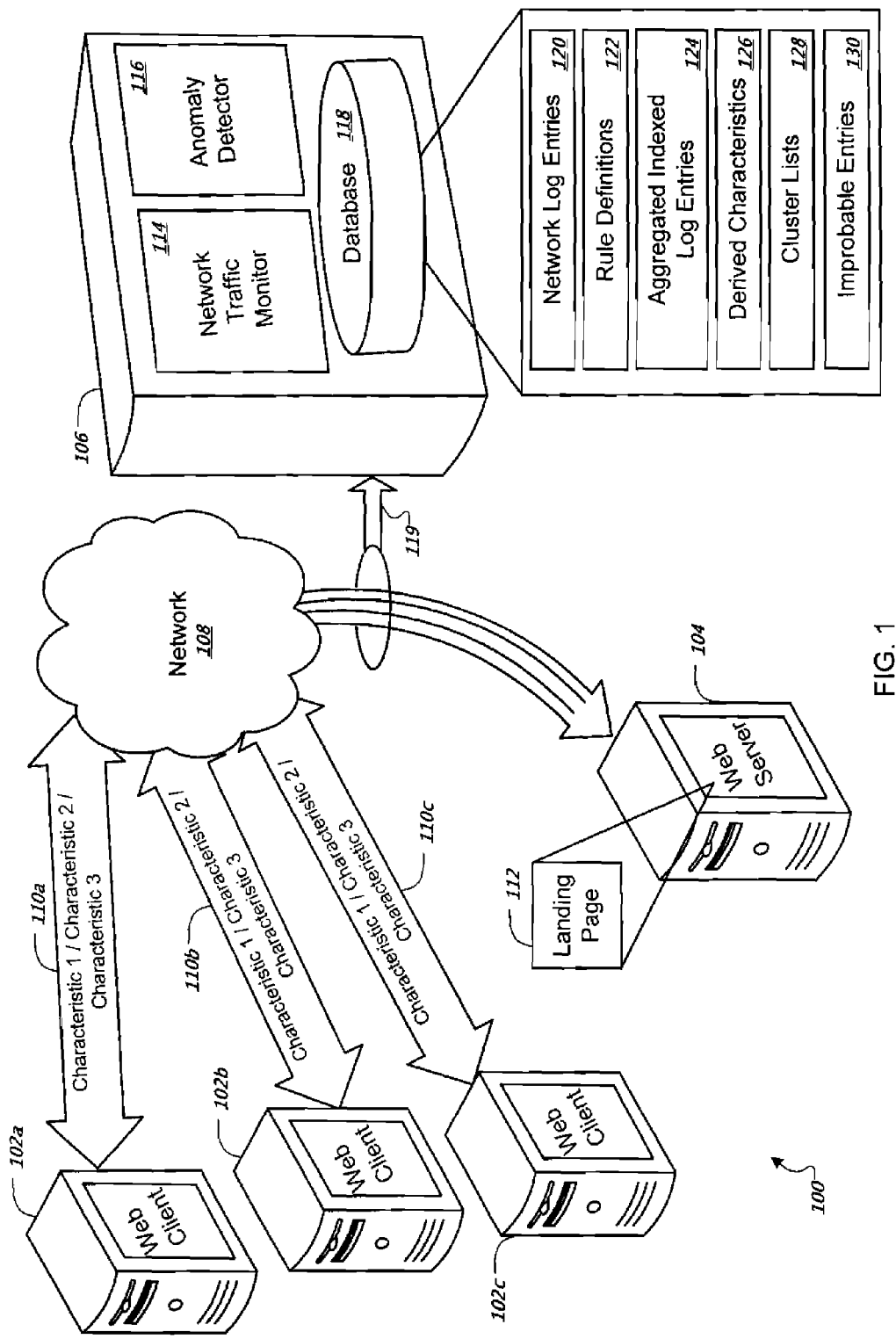
FIG. 1 schematically illustrates an example system that can be used for detecting anomalous patterns of network traffic.

FIG. 1 schematically illustrates an example system 100 that can be used for detecting anomalous patterns of network traffic. The system 100 can include clients, such as clients 102a-c, as well as a web server 104, an anomaly detection device 106, and a network 108. Though a client-server architecture is shown, other architectures are possible.

In certain implementations, clients 102a-c can send and receive network traffic to and from the web server 104 across the network 108, as illustrated by arrows 110a-c. For example, a user viewing a web page that is displayed on the client 102a can click on an advertisement ("ad") displayed on the web page. The ad may include a hyperlink to a landing page 112 that is stored on the web server 104. In certain implementations, a landing page 112 is a target web page that may be displayed if an advertisement is selected (e.g., clicked) by a user.

In certain implementations, network traffic, such as internet traffic, communicated to and from clients 102a-c can include various characteristics that can be logged by the anomaly detection device 106. For example, characteristics of the network traffic going to and from client 102a can include the Internet Protocol (IP) address of client 102a, domain names and web pages requested by users of client 102a, the date and time of the requests, identifiers associated with ads displayed to users of client 102a, and identifiers associated with ads selected by users of client 102a.

As shown in FIG. 1, the example anomaly detection device 106 can include a network traffic monitor 114, an anomaly detector component 116, and a database 118. As indicated by arrow 119, the network traffic monitor 114 can, for example, log network traffic, such as the characteristics described above, and store the values of these characteristics as network log entries 120 in the database 118.

In certain implementations, the anomaly detector component 116 can process the network log entries 120 in order to search for statistically improbable values in the characteristic data. The anomaly detector component 116 can refer to rule definitions 122, which can define criteria for determining which characteristic values are improbable. For example, a rule used to determine the improbability of the number of ad selections associated with one IP address can state that the highest (e.g., highest 2.5%) and the lowest (e.g., lowest 2.5%) of values of a general population of values can be interpreted as improbable.

In certain implementations, the anomaly detector component 116 can aggregate characteristic values and store aggregated indexed log entries 124 in, for example, the database 118. For example, characteristic values can be aggregated by time period and by client IP address, in order to store metrics, such as the number of ad impressions per IP address per time period (e.g., a client with a particular IP address may have had 15 ad impressions displayed on it between 1 pm and 1:59 pm).

In certain implementations, the anomaly detector component 116 can derive other metrics from the aggregated indexed log entries 124 and store these metrics as derived characteristics 126 in, for example, the database 118. For example, characteristics in the aggregated indexed log entries 124 might include counts of ad impressions and counts of ads clicked by users, both of which are associated with a particular IP address. The anomaly detector component 116 can create new, derived characteristics, such as click-through rate, by dividing the number of ads clicked by the number of ad impressions.

In certain implementations, the anomaly detector component 116 builds lists 128 that include groups, or clusters, which are anomalous in similar ways. For example, several clients associated with IP addresses may exhibit extremely high click-through rates in a particular time period. The lists 128 can be displayed to a user for further examination. Lists can be generated using improbable entries 130. Improbable entries 130 can be used to identify keys that have unusual values for several characteristics.

FIG. 2A is a table 200 of network log entries 120 which are examples of characteristics that can be logged by the network traffic monitor 114. In FIGS. 2A-C, the entries are indexed by source IP address 202 (e.g., an IP address of a client which initiated some network traffic). The table 200 shows traffic logged from two IP addresses, IP1 and IP2. Logged information which is associated with a particular IP address can include destination IP addresses 204 and requested web page identifiers 206 of web pages requested by users associated with that particular IP. For example, the table 200 includes "D1" and "D2" as example destinations 204 and "page 1," "page 2" and "page 3" as example requested web pages 206. In addition, a time value 208, such as the time of the request, can be stored for each entry in the log.

The network log entries 120 can include information, for example, related to advertisements, such as ad impressions 210 and ads clicked 212. In the example table 200, AD1 and AD2 are ad impressions that were displayed on the "page 1" web page to a user associated with IP address IP1, and AD2, AD3, and AD4 are ad impressions that were displayed on the "page 2" to a user associated with IP address IP2. The table 200 also shows that a user who viewed the "page 1" clicked on the AD1 ad, and that during "Hour 1" no ads were clicked on while the "page 2" was displayed.

FIG. 2B is a table 240 of example aggregated indexed log entries 124. The anomaly detector component 116 can aggregate network log entries 120, for example, by IP address and by time period. The table 240 shows data aggregated from the example table 200. In this example, table 200 contains multiple records associated with IP1, each having individual ad impression lists, ad click counts and other metrics associated with particular requests.

Corresponding records in table 240 show aggregated values related to IP1 for particular time periods, such as a count of unique destinations visited 242, a count of the number of web pages visited 244, a count of ad impressions 246, and a count of ads clicked 248. For example, during "Hour 1," users of the client associated with IP1 visited 2 web pages on 2 different destinations, and clicked on 2 of the 4 advertisements that were displayed.

FIG. 2C is a table 260 of example derived characteristics 126. In addition to aggregating characteristic values, the anomaly detector component 116 can also derive new characteristics by performing calculations involving aggregated characteristics (or unaggregated characteristics). The table 260 shows derived characteristic values computed using aggregated values from table 240. Derived characteristics 126 can include characteristics, such as click-through rate 262, IP frequency 264, and cost-per-click 266. In certain implementations, the click-through rate can be calculated for a particular IP address for a particular time period by dividing the number of ads clicked by the number of ads shown. For example, for IP address IP1 for "Hour 1," the click-through rate 262 can be calculated as 2 divided by 4, (2 ads clicked divided by 4 ads shown) or a value of 0.5.

In certain implementations, IP frequency is a derived characteristic that can be calculated by totaling the number of clicks from an IP address during a certain time period. In table 260, the IP frequency for IP1 for "Hour 1" is 2 and the IP frequency for IP2 for "Hour 1" is 0. Other derived characteristics can be calculated, such as cost-per-click, which can be calculated by totaling the sum of click costs divided by the total number of clicks from a particular IP address.

Figure 3A:
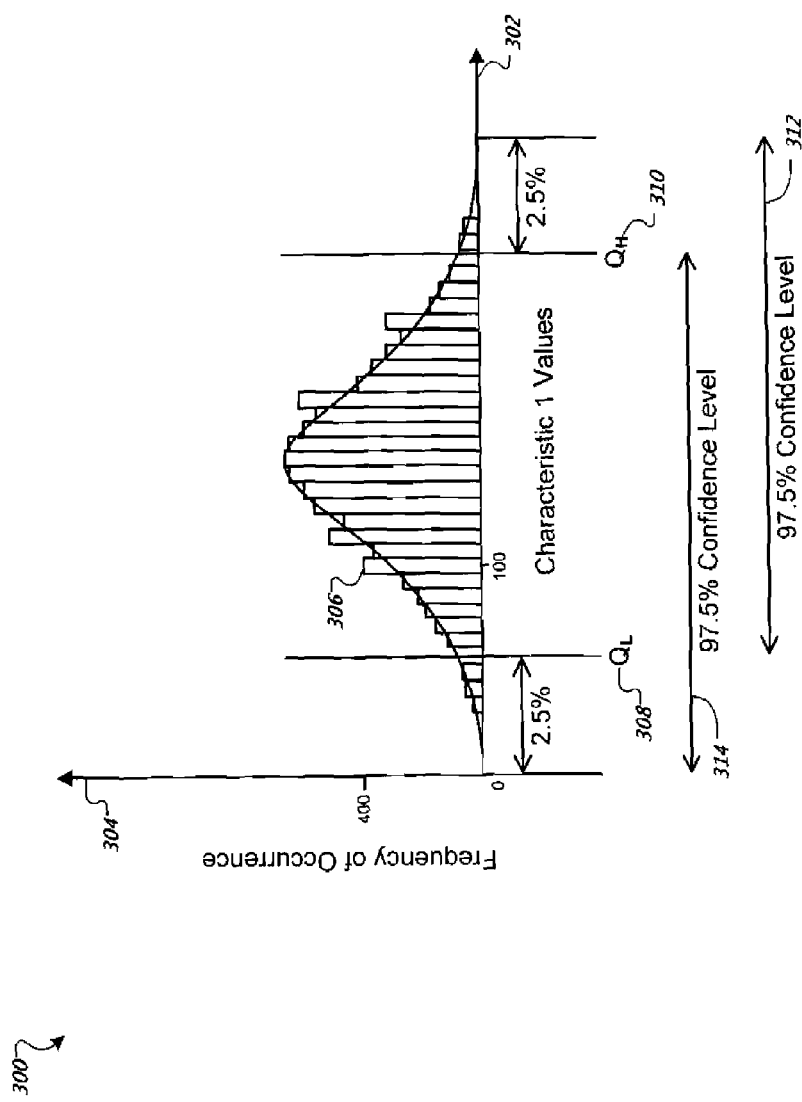
FIG. 3A is an example histogram of characteristic values.

FIG. 3A is an example histogram 300 of characteristic values. Values for a particular characteristic, such as IP frequency, can be displayed in a histogram in order to illustrate the distribution of values for the characteristic over a time period. On the histogram 300, the x-axis 302 quantifies the values of the characteristic, and the y-axis 304 represents the frequency of occurrence of particular values within the population. For example, column 306 of the histogram illustrates that the characteristic had a value of "100" 400 times in the population.

In certain implementations, the distribution of characteristic values will occur as displayed in the histogram 300, with most of the values clustered in the center. A quantile-low value ($Q_L$) 308 can be determined to identify characteristic values that are improbably low. For example, the $Q_L$ value 308 in histogram 300 is a value at which 2.5% of the population values are below $Q_L$ and 97.5% of the values are above $Q_L$. This can indicate that if a characteristic has a value below the $Q_L$ value 308, it is improbabilistically low.

Similarly, a quantile-high value ($Q_H$) 310 can identify characteristic values that are improbably high. In histogram 300, the $Q_H$ value 310 is set so that 2.5% of the population values are above $Q_H$ and 97.5% of the values are below $Q_H$.

In FIG. 3A, the values of $Q_L$ and $Q_H$ specify a confidence level. For example, a $Q_L$ value of 2.5% results in a confidence level of 97.5%, as illustrated by arrow 312. A confidence level of 97.5% means that there is a 97.5% probability that a characteristic value will be above $Q_L$. Similarly, arrow 314 illustrates that there is a 97.5% confidence level that characteristic values will be below the $Q_H$ value. The $Q_L$ and $Q_H$ values can be adjusted to create different confidence levels. For example, $Q_L$ and $Q_H$ can be set to 1% to create confidence levels of 99%.

Figure 3B:
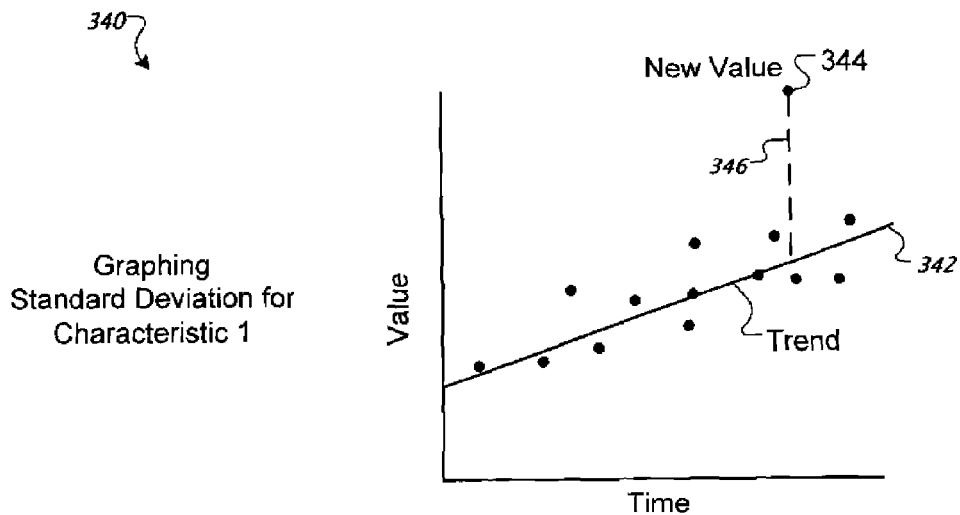
FIG. 3B is an example graph of a standard deviation test.

FIG. 3B is an example graph 340 of a standard deviation test. The previously-discussed FIG. 3A displayed characteristic values for a population as a whole, across all keys (e.g., click-through rate for all logged IP addresses). In certain implementations, characteristic values can also be compared for a single key, by comparing current and historical values for a selected characteristic of a particular key, such as the click-through rate for a particular IP address. For example, click-through rate values can be compared for a particular IP for all days within the past month.

In certain implementations, historical values for a characteristic for a particular key can be plotted on a graph 340, and a line 342 can be fitted to the points. The line can illustrate the trending behavior of the values. As new values are being logged, a new characteristic value 344 can be compared to the predicted trend of the existing values. If a new value exceeds the predicted trend of the previous values, the new characteristic value can be identified as improbable.

For example, the IP frequency associated with a particular IP address may trend slightly upward at a known slope over a certain time period. If new values for IP frequency for that IP address are much larger, the standard deviation test can identify the IP address for further investigation, because it deviates beyond a predetermined value from the value predicted by the trend line. Although this example describes using a standard deviation test, other techniques can be used to determine whether values are improbable.

Figure 3C:
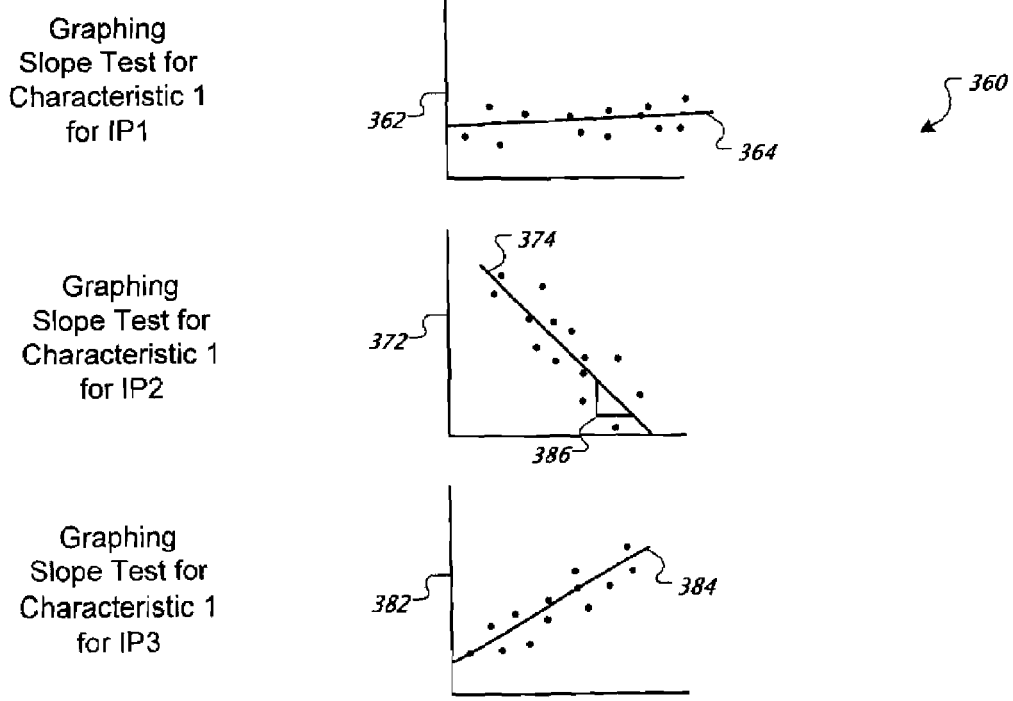
FIG. 3C is an illustration of example slope test graphs.

FIG. 3C is an illustration 360 of slope test graphs. As mentioned above, values for a selected characteristic of a particular key can be plotted and fitted to a line. The anomaly detector component 116, for example, may calculate a slope of the line, which gives an indication of a rate of change for the characteristic over time. In FIG. 3C, lines that are relatively flat indicate relatively little change in characteristic values over time. Lines that have relatively steep slopes, however, are indicative of characteristic values that are changing a relatively high amount over a period of time, which can be an indicator of fraud.

For example, graph 362 displays a line 364, which has been fitted to example values for a characteristic for a particular IP address (IP1 in this example). Graphs 372 and 382 show values for the same characteristic, but for other IP addresses (IP2 and IP3, respectively). A line 374 has been fit to the characteristic values associated with IP2, and a line 384 has been fit to the characteristic values associated with IP3. The slope of a line, such as line 374, can be calculated, as illustrated by slope 386, as the change in the y-value (e.g., the change in characteristic value) divided by the change in the x-value (e.g., the change in time).

Line 384 has a slope which is relatively steep, as compared to the slope of line 364, which is relatively flat. Line 374 also has a steep slope, where the slope is negative (e.g., the characteristic values are getting smaller over time). Steep slopes can be indicative of fraud because the characteristic value is changing relatively rapidly over time. Slopes can be calculated for each key (e.g., all IP addresses) within a population, and the keys associated with the slopes that exceed a threshold can be further examined (e.g., as possibly associated with fraud).

Figure 4:
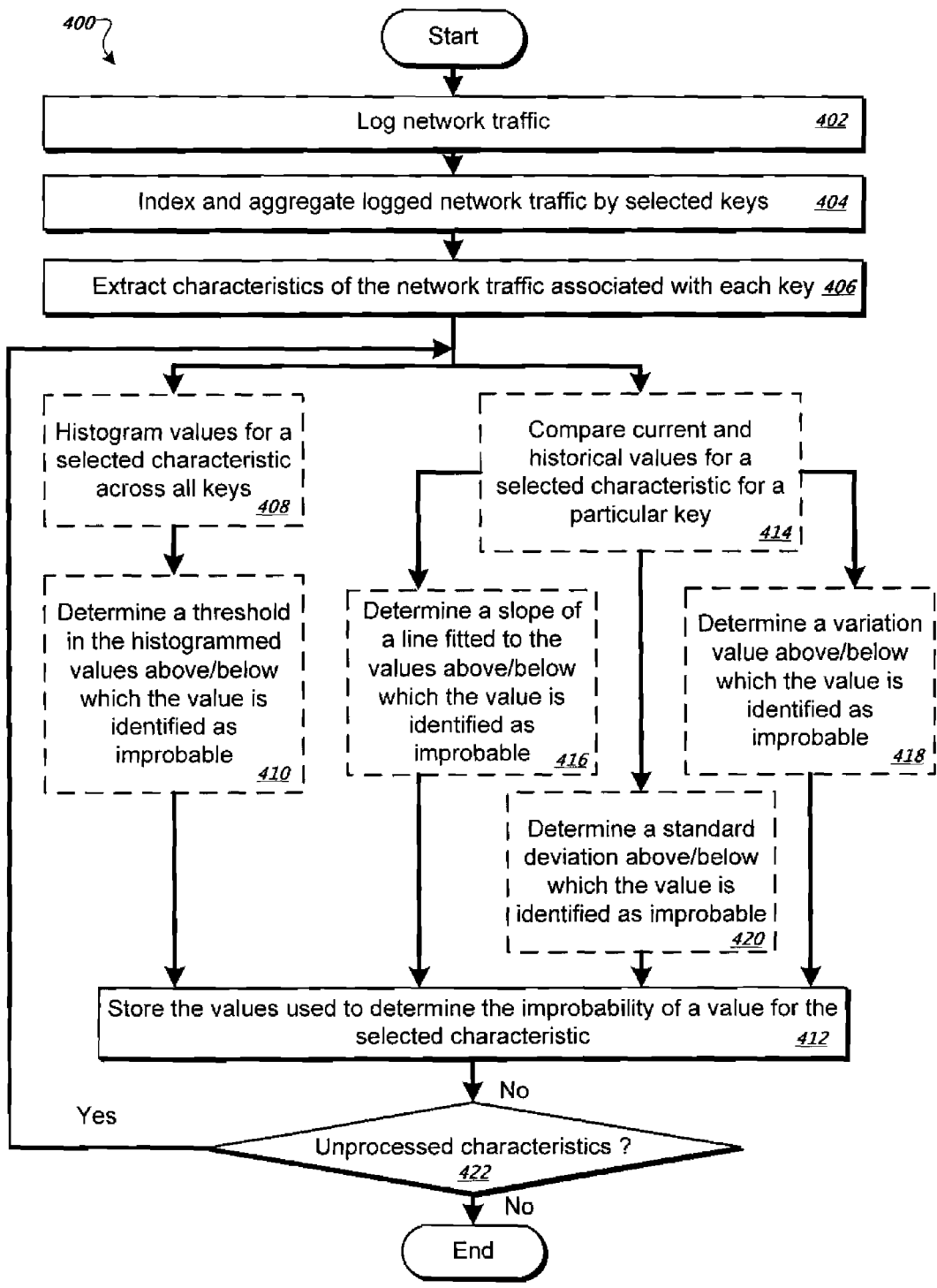
FIG. 4 is a flowchart showing an exemplary method for building normal distributions used to determine the improbability of characteristic values.

FIG. 4 is a flowchart showing an example method 400 for generating distributions (which in some implementations can be used to determine improbability of characteristic values). In step 402, network traffic is logged, for example, by the network traffic monitor 114. The logged traffic can be stored, for example in network log entries 120, as illustrated in FIG. 2A.

In step 404, network traffic is indexed and aggregated (e.g., by the network traffic monitor 114) based on selected keys. The indexed and aggregated data can be stored, for example, as the aggregated indexed log entries 124. FIG. 2B illustrates example aggregated indexed log entries. Data can be indexed by IP address, by landing page 112, or by another logged characteristic. Data can be aggregated by time period, such as by hour, day, week, month, year, or other characteristic.

In step 406, derived characteristics are extracted from the aggregated indexed log entries (e.g., by the anomaly detector component 116). Derived characteristics, such as IP frequency, click-through rate, and cost-per-click, can be derived from other characteristics, as described above in association with the FIG. 2C. Derived characteristics then can be stored, for example, in the database 118.

Once characteristics have been aggregated and indexed, and derived characteristics have been extracted, one or more distributions can be generated (e.g., by the anomaly detector component 116) and used for determining if received characteristic values are improbable.

In the example method 400, distributions based on two sets of data are shown. The sequence of steps starting with step 408, for example, uses characteristics from a current population of keys (e.g., IP addresses), while the sequence of steps starting with step 414 uses a characteristic for a particular key (e.g., a single IP address) over a historical time period.

The sequences of steps starting with the steps 408 and 414 are dashed in FIG. 4 to indicate they are optional steps. In certain implementations, the steps beginning with step 408 can be performed, and in other implementations, the steps beginning with step 412 can be performed. Additionally, any combination of the optional steps can be performed, or other methods to detect anomalies can be substituted for the dashed steps of FIG. 4.

Starting in step 408, a distribution is generated (e.g., by the anomaly detector component 116) based on the range of values for a particular characteristic obtained from multiple keys. Starting in step 414, a second type of distribution is generated (e.g., by anomaly detector component 116) based on a range of values for a characteristic for a single key over a time period.

In step 408, a histogram is created (e.g., by the anomaly detector 116) using values for a selected characteristic across all keys. For example, values for a characteristic, such as IP frequency, can be graphed for all IP addresses for a particular time period. FIG. 3A is an example histogram.

In step 410, threshold values are determined above or below which characteristic values are identified as improbable. For example, the anomaly detector 116 can determine that the quantile-low ($Q_L$) 308 and quantile-high ($Q_H$) 310 values in FIG. 3A are threshold values. A $Q_L$ value of 2.5% means that 97.5% of the population values for the selected characteristic are higher than $Q_L$. Values lower than $Q_L$ can be identified as improbable. Similarly, values higher than a $Q_H$ value can be identified as improbable.

In step 412, values, such as the $Q_L$ and $Q_H$ values, are stored (e.g., by the anomaly detector 116) for use in determining an improbability of new characteristic values.

Steps 414-420 may provide an alternate or additional processing flow to steps 408-412. In step 414, current and historical values are compared for a selected characteristic for a particular key. For example, the anomaly detector component 116 can compare IP frequency values that have been recorded daily for the past month for a particular IP address. In certain implementations, the anomaly detector component 116 can perform slope, variance, and standard deviation comparisons using the current and historical values for the particular key.

In step 416, a slope of a line fitted to the historical values for the selected key is determined, as shown for example in FIG. 3C. The anomaly detector component 116 can, in another method described below, compare a new slope value to historical slope values to determine if new characteristic values are improbable. Next, in the step 412, the slope value determined in step 416 is stored.

In step 418, a variance value is determined (e.g., by the anomaly detector 116) for the historical data for a particular key. Unusual variance in historical data may indicate fraud. For example, if a fraudulent user created a software program to automate repetitive selection of advertisements, certain characteristics, such as click-through rate, may be extremely uniform, and the historical data for particular keys may show extremely little or no variance compared to other keys in the population. In step 412, the variance value determined in step 418 is stored.

In step 420, mean and standard deviation values are determined. For example, the anomaly detector 116 can identify a new characteristic value which is greater than an identified standard deviation from the mean of historical values as improbable. In step 412, the mean and standard deviation values determined in step 420 are stored.

After values are stored in step 412, determination is made (e.g., by the anomaly detector component 116, in step 422, whether there are unprocessed characteristics. If there are no more unprocessed characteristics, the method ends. If there are more characteristics, they can be processed as described above starting with step 408, step 414, or both steps.

Figure 5:
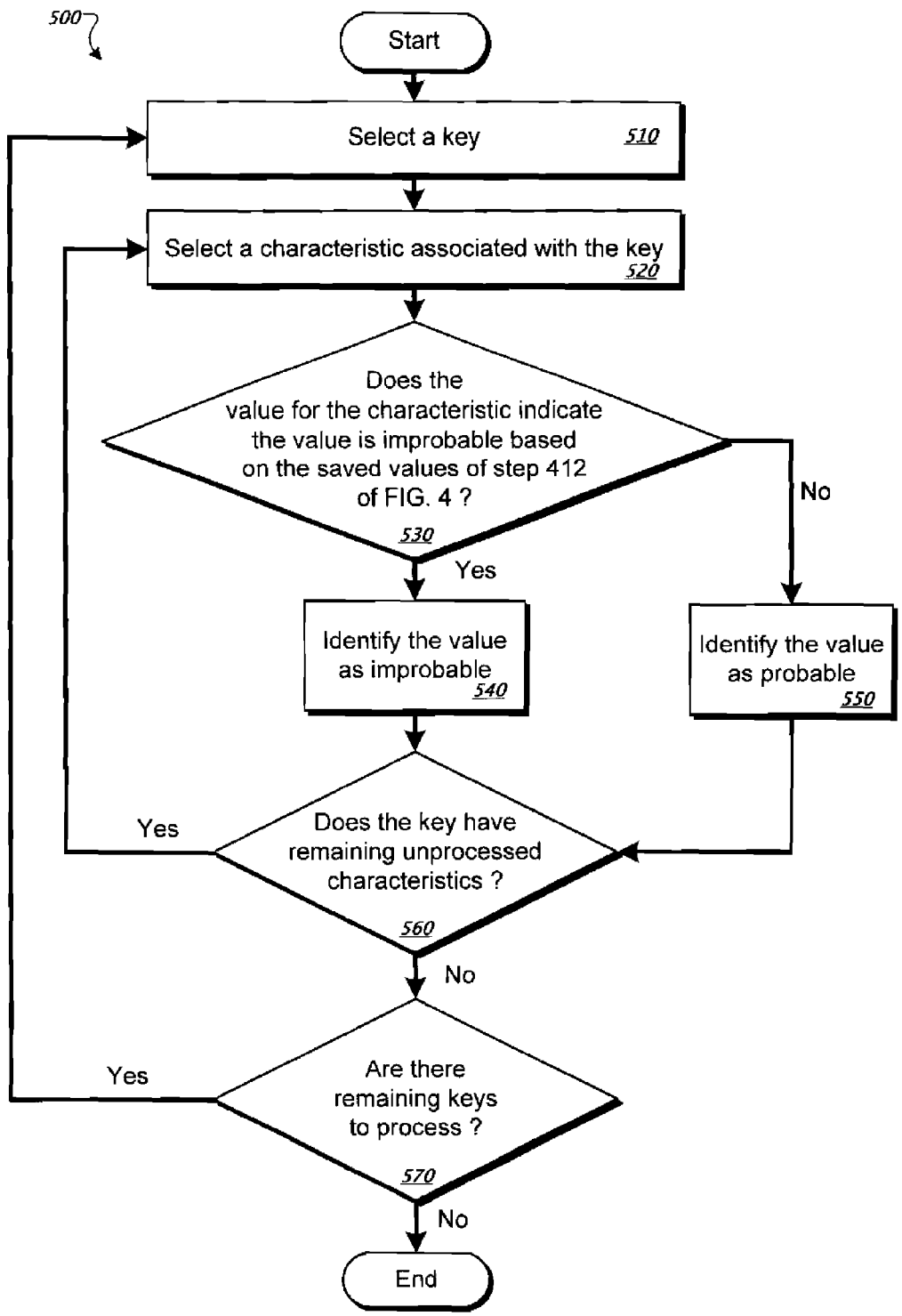
FIG. 5 is a flowchart for an example method for identifying abnormal characteristic values.

FIG. 5 is a flowchart for an example method 500 for identifying abnormal characteristic values. In certain implementations, the method 500 is performed by the anomaly detector component 116. In step 510, a key, such as an IP address, is identified. In other implementations, a user may designate other keys, such as a network domain or a particular web site address. In step 520, a characteristic associated with the key is identified. For example, an IP frequency value for a particular IP address can be selected.

In step 530, tests can be performed to determine whether a value for the selected characteristic is improbable based on, for example, a threshold, such as the saved threshold values of step 412 of FIG. 4. For example, the value for the selected characteristic for the selected key is compared to one or more threshold values, such as a $Q_L$ threshold value or a $Q_H$ threshold value. The value for the selected characteristic can also be compared to historical values for the selected key using variance, standard deviation, slope, or other tests, such as the tests described in FIGS. 3B-3C. If a test indicates that the characteristic value is improbable, the value can be identified as improbable in step 540. If none of the tests indicate that the characteristic value is improbable, the value is identified as probable in step 550.

In step 560, a test is performed to determine whether there are remaining unprocessed characteristics to be processed for the selected key. If there are unprocessed characteristics, step 520 is performed and another characteristic is identified. If there are no unprocessed characteristics, step 570 is performed.

In step 570, a test is performed to determine whether there are remaining keys to process. If there are remaining keys to process, step 510 is performed and another key is identified. If there are no remaining keys to process the method ends.

FIG. 6 is an example table 600 of improbable entries 130. The output of the method 500 described above can be stored in the table 600. For each key of the table 600, and for each characteristic, values can be stored. In this example, two binary values are stored. For example, a key can be an IP address, a first characteristic (C1) associated with that key can be IP frequency, and a second characteristic (C2) associated with that key can be click-through rate.

In certain implementations, a first binary value can be stored to indicate whether a characteristic value for a particular key is lower than a first threshold (e.g., the $Q_L$ threshold). A value of "one" can indicate that the characteristic value is lower than the $Q_L$ threshold, and a value of "zero" can indicate that the characteristic value is higher than the $Q_L$ threshold. For example, a "one" value 602 can indicate that the value for characteristic C1 of an IP address $IP_6$ is lower than a $Q_L$ threshold. A value lower than the $Q_L$ threshold may indicate anomalous activity for this characteristic. In contrast, a "zero" value 604 can indicate that the value for characteristic C1 for IP address $IP_1$ is not below a $Q_L$ threshold.

Similarly, for each characteristic of each key, a second value (e.g., a binary value) can be stored to indicate whether the characteristic value is higher than a second threshold (e.g., the $Q_H$ threshold). For example, a "one" value 606 can indicate that the value for characteristic C2 for IP address $IP_2$ is higher than a $Q_H$ threshold. Here, a value higher than the $Q_H$ threshold may indicate anomalous activity for characteristic C2. A "zero" value 608 can indicate that for IP address $IP_4$, the value for characteristic C2 was not higher than a $Q_H$ threshold.

In some implementations, the number of samples in the histogram can influence the accuracy of the identifying a characteristic value as improbable. For example, if a histogram included 500 samples as opposed to five samples, a value that falls within the top 20% of the former histogram is more likely to actually be in the top 20% of the total population because the number of samples increases the trustworthiness of the determination.

In certain implementations, a confidence interval is the statistical method used to capture the concept of "trustworthiness" in this context. With many characteristics, the system can compute a statistical confidence interval for a characteristic value if the system has some a-priori information describing the distribution from which the characteristic value came. For example, if the value came from a Binomial distribution, the system can use a binomial test to determine a statistical confidence level.

In another illustrative example, for an index $I_x$, a characteristic $C_x=4/5=0.8$ may have a confidence interval of [0.75, 0.9], while an index $I_y$ has a characteristic $C_y=400/500=0.8$ that may have a confidence interval of [0.79, 0.81]. Here the confidence interval for $I_y$ is less than the confidence interval for $I_x$ because the former is more trustworthy because it is part of a larger sampling group.

The system can compare the upper bound of the confidence interval against the left cutoff on a histogram for $C_x$, and the lower bound against the right cutoff of the histogram. In certain implementations, the system uses a substantially similar technique to increase the probability that when a characteristic is identified as unusual, the system accounts for sufficient sampling accuracy.

Once improbable entries 130 have been generated, the anomaly detector component 116 can sort the entries to identify entries that have the greatest amount of values indicating anomalies (e.g., "one" values). The entries that have the greatest amount of values indicating anomalies are likely improbable and may indicate fraudulent activity.

In addition, the anomaly detector component can examine the improbable entries 130 and determine if there are entries that are improbable in similar ways. For example, entries, such as the example entries shown in FIG. 6, may have similar patterns of binary values. Sets of entries that are unusual in similar ways can be stored lists, such as a cluster list 822 of FIG. 8.

The cluster list can display clusters of characteristics that have substantially similar abnormal values. A cluster list, such as the cluster list 822, can include a cluster id used to identify a cluster of similar entries, a number of "hot bits," which indicates how many abnormal characteristics are included in the entries of the cluster, how many entries are in the cluster, and other information (more fully described in association with FIG. 8) related to the cluster.

In certain implementations, the cluster list is displayed to a user for further investigation (e.g., a final determination that the anomalous activity is fraudulent, modifications of system responses, such as discarding clicks from an IP address associated with anomalous activity, etc.)

Figure 7:
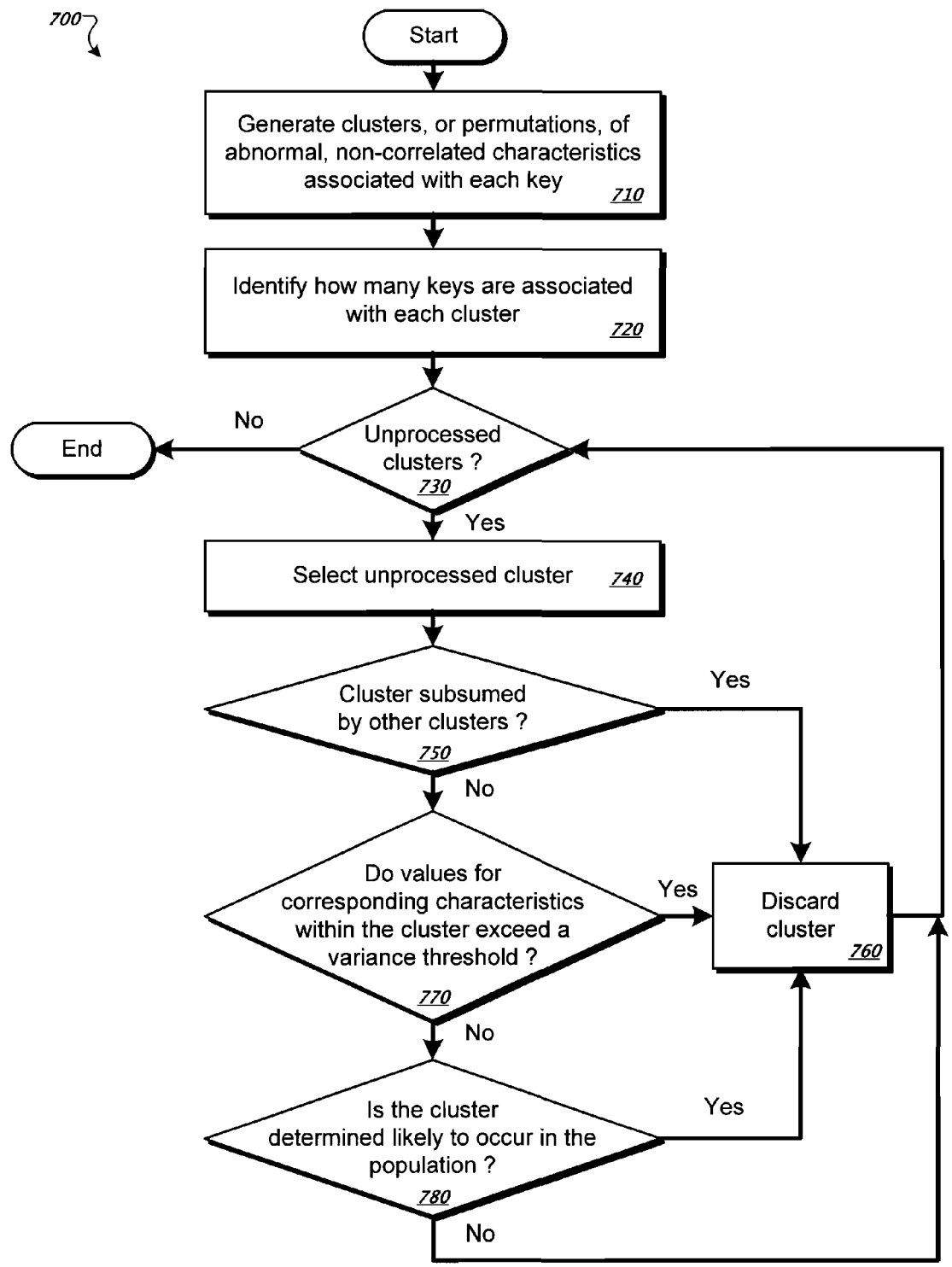
FIG. 7 is a flowchart for an example method for generating and refining lists.

FIG. 7 is a flowchart for an example method 700 for generating and refining lists. In certain implementations, the method 700 is performed by the anomaly detector component 116.

In step 710, clusters are generated. A cluster can be described as a permutation of abnormal characteristic values, where the permutation is exhibited for one or more keys. For example, in the table 600, the improbability index entries associated with IP addresses $IP_5$ and $IP_6$ indicate that these two IP addresses have the same permutations of characteristics that have abnormal values (e.g., for both IP addresses, the first characteristic was abnormally low and the second, third and fourth characteristics were abnormally high). In another example, the following six clusters of three or more abnormal characteristics can be generated from the example data in the table 600: {C1_L, C2_H, C3_H, C4_H}, {C1_L, C2_H, C4_H}, {C1_L, C2_H, C3_H}, {C1_L, C3_H, C4_H}, {C2_H, C3_H, C4_H}, {C1_H, C3_L, C4_L}.

In certain implementations, the following algorithm can be used to generate the permutations:

For each index $I_x$ in $\{I_1, \ldots, I_n\}$
   Generate all permutations $P_1, \ldots, P_p$ of the anomalous, non-correlated bits of $I_x$. Consider only those permutations of some minimum size (e.g., 3)
   For each permutation $P_y$ in $\{P_1, \ldots, P_p\}$
     Insert a record containing $I_x$ in a hashtable using $P_y$ as the key
     If $P_y$ is already keyed in the hashtable, add $I_x$ to the $P_y$ record
   End For
End For As noted in the above algorithm, in some implementations correlated characteristics can be excluded from lists. For example, one characteristic might be related to cookies and another characteristic may be related to logins. Since logins can involve cookies, an unusually high login count may correlate to an unusually high cookie count. Therefore only one characteristic (either related to cookies or logins) is included in the cluster because the characteristics are correlated.

Also as noted in the above algorithm, in certain implementations, only clusters of at least a minimum size are generated. In the example shown, clusters of three characteristics or greater are generated.

In step 720, a count of keys (e.g., IP addresses or web sites) associated with each cluster can be identified. For example, in the data of the table 600, two IP addresses ($IP_5$ and $IP_6$) have abnormal characteristic values in a cluster of {C1_L, C2_H, C3_H, C4_H}. As additional examples, the cluster {C1_H, C3_L, C4_L} is associated with one key ($IP_1$), and the cluster {C1_L, C2_H, C4_H} is associated with three keys ($IP_3$, $IP_5$, and $IP_6$).

The remaining steps of the method 700 involve refining lists. In step 730, it is determined if there are unprocessed clusters. If there are additional clusters to process, step 740 is performed. If there are no remaining unprocessed clusters, the method ends.

In step 740, an unprocessed cluster is selected. In step 750, a determination is made (e.g., by the anomaly detector component 116) if the selected cluster is subsumed by other clusters. Subsumed clusters can be subsets of other clusters. For example, in the six example clusters discussed above, the clusters {C1_L, C2_H, C3_H}, {C1_L, C2_H, C4_H}, {C1_L, C3_H, C4_H}, and {C2_H, C3_H, C4_H}, are subsumed in the cluster {C1_L, C2_H, C3_H, C4_H}. If the selected cluster is subsumed by another cluster, step 760 is performed, and the selected cluster is discarded. After the cluster is discarded, the step 730 may be repeated to check for additional unprocessed clusters.

If the selected cluster is not subsumed by another cluster, then step 770 is performed. In step 770, the selected cluster is examined for homogeneity. For example, the anomaly detector component 116 can compare corresponding characteristics for all keys associated with the selected cluster to ensure that the keys have similar values for corresponding characteristics. For example, a key with an extremely high cost-per-click rate can be considered to be dissimilar to a key with an extremely low cost-per-click rate. A variance value can be calculated for each characteristic of keys associated with the cluster. If the selected cluster has a variance level for one or more characteristics that is higher than a threshold, then step 760 can be performed, and the selected cluster can be discarded. After discarding the cluster at the step 760, the method 700 can return to the step 730 to determine if there are additional unprocessed clusters.

If the characteristics of the selected cluster have a variance level less than a threshold, step 780 can be performed. In step 780, a determination is made (e.g., by anomaly detector component 116) if the cluster is likely to appear in the population. A probability of the natural occurrence of a cluster can be calculated. For example, consider a cluster {C2_H, C3_H, C4_H}. Probabilities can be calculated for each component of the cluster. For example, it can be determined how many times in the population the characteristic C2 was abnormally high. The probability of the selected cluster can be determined, for example, by multiplying together the individual probabilities of the constituent components of the cluster (for example, the probability of C2_H multiplied by the probability of C3_H multiplied by the probability of C4_H).

The calculated probability value for the selected cluster can be used to calculate an expected cluster size (e.g., the number of keys associated with the cluster). The expected size of a cluster that naturally occurs in the population can be given by, for example, a Poisson distribution, with a lambda parameter value equal to the probability value for the selected cluster. Upper and lower (e.g., 5%) confidence intervals can be calculated for this Poisson distribution, and if the cluster size is either below or, respectively, above this confidence interval, then the cluster can be discarded in step 760. After discarding the cluster at the step 760, the method 700 can return to the step 730 to determine if there are additional unprocessed clusters.

FIG. 8 is an example set of clusters displayed in a user interface 800. The user interface 800 can be used to view generated lists 128. A run identifier 802 and run date 804 can be displayed which can be used to distinguish generated lists 128, for example on printed reports. A "Stats" value 806 can indicate a key that is used for cluster generation, such as IP addresses, landing pages, etc. A confidence interval 808 can indicate the $Q_L$ and $Q_H$ thresholds used to generate the clusters.

The user interface 800 can include a rule list 810 having rules that define when characteristics are anomalous. The rule list 810 can include rule names, such as "Char1_Fit_H" 814 and "Char1_Slope_L" 816 as shown in column 812. For example, the name "Char1_Fit_H" 814 can be a rule that defines when a variance, such as the variance determined by the variance tests discussed in association with FIG. 5, to be abnormally high. The name "Char1_Slope_L" can be associated with a rule that defines when a slope, such as the slope determined by the slope tests discussed in FIG. 4, to be abnormally low.

The rule list 810 can include rule definitions, such as those shown by column 816. For example, a rule definition 818 can define content of the rule 814. The rule definition 818 describes a line-fit test which determines if a line fit to historical values is abnormally above a predicted line. The rule definition 818 defines tests to see if there are, for example, at least 4 samples of the characteristic "Char1," and if the value of "Char1" is more than, for example, five linear-fit error units above the predicted linear value of the samples.

In another example of rule definition, a rule definition 820 can define the rule 816. The rule definition 820 can include a test to see if there are at least 4 samples of characteristic "Char1". If a slope calculated using the new and historical values of "Char1" is less than a threshold value, the value for the characteristic can be marked as abnormal.

A cluster list 822 can display clusters of characteristics that have substantially similar abnormal values. The user interface 800 includes a cluster id column 824 that displays an identifier that is used to distinguish clusters. Also, a "hot bits" column 826 can be displayed that indicates how many abnormal characteristics are included in the cluster.

A cluster definition column 828, as shown in FIG. 8, displays the specific combinations of abnormal characteristics that define a cluster. For example, a cluster definition 830 defines the rules that are included in the cluster with cluster id 486995. The cluster definition 830 includes abnormal characteristics Char1_H, Char2_H, and Char3_H (and additional abnormal characteristics truncated for ease of illustration).

The user interface 800 can include a cluster size column 832 that displays the number of keys (e.g., IP addresses) that have abnormal values according to the cluster definition. For example, a cluster size 834 indicates that two IP addresses have associated abnormal values that match the cluster definition 830. Additionally, the cluster list 822 can display other statistics for keys that are associated with the cluster, such as a page view count 836 (e.g., the cluster with cluster id 487000 was viewed 131 times), an advertisement impression count 838 (e.g., the cluster with cluster id 487000 has 945 impressions), an advertisement click count 840 (e.g., the cluster with cluster id 487000 has 240 clicks) and an advertisement click revenue total 842 (e.g., the cluster with cluster id 487000 has a revenue total of $296.17).

Figure 9:
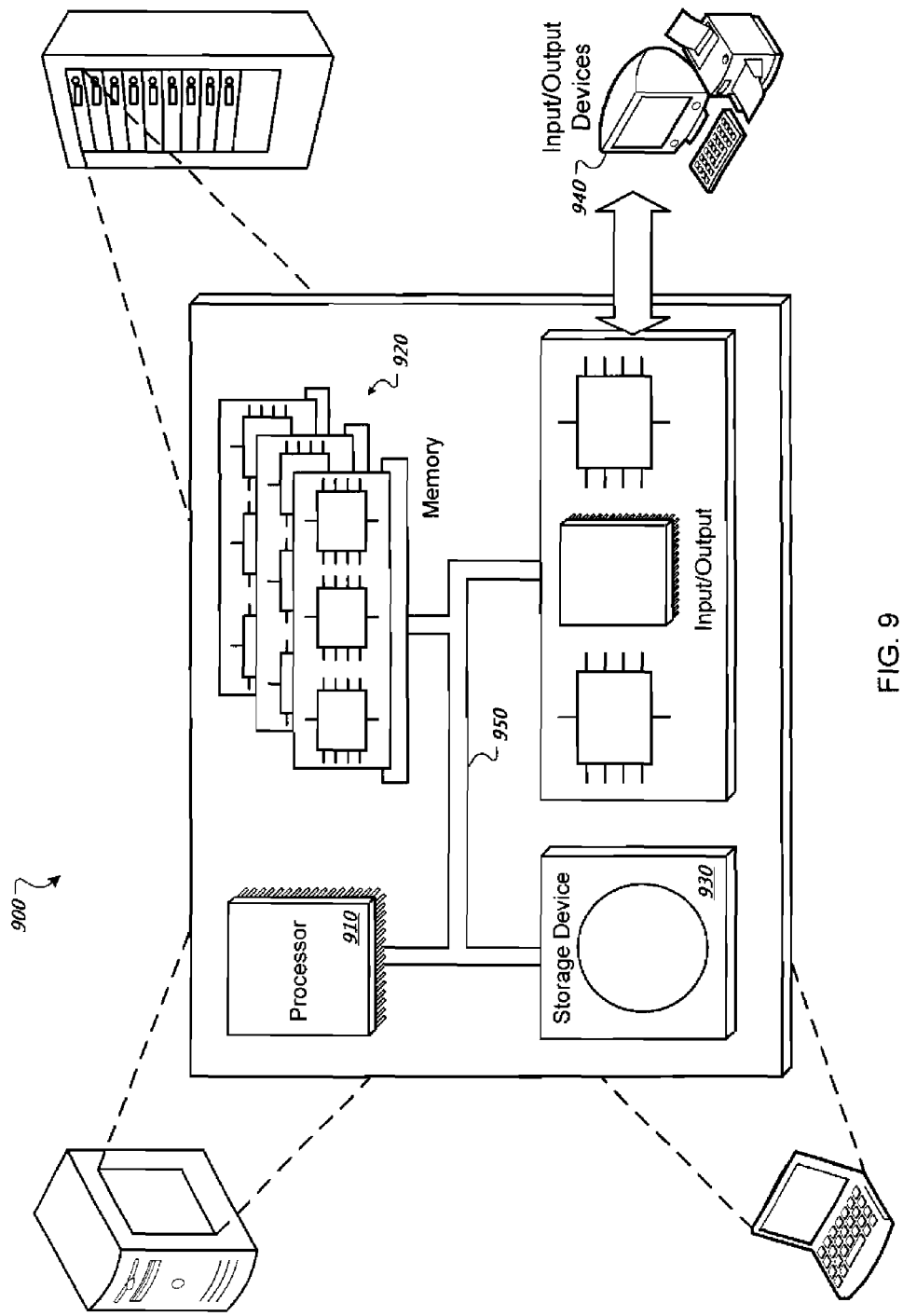
FIG. 9 is a schematic diagram of a general computer system.

FIG. 9 is a schematic diagram of a computer system 900. The system 900 can be used for the operations described in association with any of the methods described previously, according to one implementation. Though a computing system is shown, the proposed methods can be implemented in other electronic devices. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, when a transaction component is identified as unusual, an alert can be transmitted to a user for investigation. For example, an email can be transmitted to a user stating that an IP address $IP_x$ has an unusually high click-through rate for advertisements.

Additionally, the alert may include a percentage that indicates how unusual a particular networking characteristic is in a distribution of the all of the logged network traffic. For example, the email transmitted to the user can include a percentage indicating that the click-through rate for $IP_x$ is in the $99^{th}$ percentile of all logged click-through rates.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

In yet other implementations, the above described systems and methods can be used to detect various forms of networking fraud, such as click fraud, denial of service fraud, and also used in other computer-aided anomaly detection, where there are distinct streams of activity characterized by particular signals, or characteristics.

In certain implementations, the systems and techniques can be used to detect anomalies contexts other than fraud, such as in a nuclear power plant context. More specifically, a nuclear power plant can produce electricity using heat from a controlled nuclear reaction. Specifically, the nuclear reaction can produce heat that boils water, and the resulting steam can rotate a turbine that produces electricity using a dynamo. Power plants can be extremely large, complicated ensembles and may be monitored for dangerous or failure conditions.

One or more control panels at the nuclear power plant may display or log various characteristics to be monitored, such as temperature and pressure at various points in the reactor, water coolant temperature and pressure (for water cooled reactors), temperature and diameter of the graphite rods (for graphite cooled reactors), pressure of $CO_2$ (for gas cooled reactors), concentration of lead any leaked around the plant (for lead cooled reactors), concentration of potentially dangerous water vapors around the reactor (for sodium cooled reactors), radiation output at various points in the reactor, by particle type (alpha, gamma, etc.), steam pressure in the pressure vessel, rotational speed of the electrical generator shaft, amount of water leaving the condenser as a result of steam condensation, and electrical power (watts) demand for output points from the nuclear power plant.

These measures can be continuously verified to make sure that they do not exceed normal bounds. Specifically, for all the measures above, the described system and methods can be used to record the range of each measure across multiple similar power plants and used to record the historical range of each measure for the particular power plant that is monitored. Additionally, cutoffs, or thresholds, can be computed for these measures as described. In certain implementations, if the recorded value of a measure exceeds its cutoff, an alert can be output. The more alerts that are output, the greater the probability that the nuclear plant is experiencing an anomalous event.

Additionally, in certain implementations, different automated responses are generated based on a function of the number of alerts output. For example, if three alerts are output that indicate three characteristics are anomalous, an interface can output an automated response to warn an operator. If five alerts are output, the power plant can initiate a shutdown.

In other implementations, the systems and methods can be used in an air traffic control context, where the measured metrics can include inflow and outflow of passengers or planes, weight or number of luggage per passenger, etc. In yet other implementations, the systems and methods can be used in a greenhouse context, where the measured metrics can be temperature, $CO_2$ concentration, etc. Accordingly, other implementations are within the scope of the following claims.

What is claimed is:

1. A method comprising:
monitoring characteristics associated with one or more sampled transaction components of a plurality of transaction components;
determining whether a value for a first monitored characteristic of the monitored characteristics is unusual based on whether the value is located within a predefined portion of a distribution of values for the first monitored characteristic;
identifying one or more sampled transaction components as unusual when a predetermined number of values for the monitored characteristics are determined to be unusual; and
generating clusters comprising a plurality of permutations of the monitored characteristics identified as unusual.

2. The method of claim 1, further comprising associating the one or more sampled transaction components having substantially similar unusual monitored characteristics with clusters that have corresponding permutations of monitored characteristics.

3. The method of claim 2, further comprising discarding a cluster when monitored characteristics for the one or more sampled transaction components associated with the cluster do not meet a homogeneity measure.

4. The method of claim 3, wherein the homogeneity measure comprises a standard deviation measure.

5. The method of claim 2, further comprising outputting one or more of the clusters for inspection by a user.

6. The method of claim 1, wherein the monitored characteristics comprise logged information associated with network traffic.

7. The method of claim 1, wherein the values included in the distribution comprise values for the first monitored characteristic associated with the plurality of transaction components.

8. The method of claim 1, wherein the one or more sampled transaction components are selected from a group consisting of IP addresses, landing pages, networking domains, and cookies.

9. The method of claim 1, further comprising determining when the first monitored characteristic is unusual based on previous values for the first monitored characteristic.

10. The method of claim 9, wherein the first monitored characteristic is determined to be unusual when the value of the first monitored characteristic exceeds a number of standard deviations from a mean or a predicted value of a linear prediction based on previous values for the first monitored characteristic.

11. The method of claim 10, wherein the first monitored characteristic is determined to be unusual when a slope of a line fit to current and previous values exceeds a predetermined slope threshold.

12. The method of claim 11, wherein the first monitored characteristic is determined to be unusual when current and historical values of the first monitored characteristic vary less than a variation threshold that specifies a minimum amount of variation between the values.

13. The method of claim 1, further comprising generating the distribution of the values for the first monitored characteristic based on a histogram of the values segmented by frequency of occurrence.

14. The method of claim 13, wherein the predefined portion of the distribution comprises a value range greater than a threshold value based on a distribution of the segments of the histogram.

15. The method of claim 13, wherein the predefined portion of the distribution comprises a value range less than a threshold value based on a distribution of the segments of the histogram.

16. The method of claim 1, further comprising generating an index that includes identifiers for the monitored characteristics associated with the one or more sampled transaction components.

17. The method of claim 16, wherein keys for the index comprise identifiers for the one or more sampled transaction components.

18. The method of claim 16, further comprising associating an identifier for the first monitored characteristic with a value signifying whether the first monitored characteristic is unusual.

19. The method of claim 17, wherein values signifying whether the monitored characteristics are unusual are stored as bits in a bit vector associated with a key representing the one or more sampled transaction components associated with the monitored characteristics.

20. A system comprising:
a network traffic monitor to monitor characteristics associated with one or more sampled transaction components of a plurality of transaction components; and
means for:
determining whether a value for a first monitored characteristic of the monitored characteristics is unusual based on whether the value is located within a predefined portion of a distribution of values for the first monitored characteristic;
identifying the one or more sampled transaction components as unusual when a predetermined number of values for the monitored characteristics are determined to be unusual; and
generating clusters comprising a plurality of permutations of the monitored characteristics identified as unusual.

* * * * *